United States Patent
Mahajan et al.

(10) Patent No.: US 11,650,901 B2
(45) Date of Patent: May 16, 2023

(54) AUTOMATED GENERATION OF SOFTWARE PATCHES

(71) Applicant: FUJITSU LIMITED, Kawasaki (JP)

(72) Inventors: Sonal Mahajan, Fremont, CA (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/030,298

(22) Filed: Sep. 23, 2020

(65) Prior Publication Data

US 2022/0091963 A1    Mar. 24, 2022

(51) Int. Cl.
*G06F 11/36* (2006.01)
*G06F 8/65* (2018.01)
*G06F 8/71* (2018.01)

(52) U.S. Cl.
CPC .......... *G06F 11/3608* (2013.01); *G06F 8/65* (2013.01); *G06F 8/71* (2013.01); *G06F 11/3636* (2013.01)

(58) Field of Classification Search
CPC .......... G06F 11/3608; G06F 8/65; G06F 8/71; G06F 11/3636; G06F 8/53; G06F 11/3664; G06F 11/362; G06F 3/0482; G06F 8/33
See application file for complete search history.

(56) References Cited

U.S. PATENT DOCUMENTS

2017/0212829 A1* 7/2017 Bales ................. G06F 11/3612
2019/0121717 A1* 4/2019 Francis ................ G06F 11/366

OTHER PUBLICATIONS

Jiaxi Xu et al.; Defect Prediction With Semantics and Context Features of Codes Based on Graph Representation Learning; IEEE; pp. 613-625; retrieved on Nov. 30, 2022 (Year: 2021).*

Thomas Joshua Shippey; Exploiting Abstract Syntax Trees to locate Software Defects; Uhra.jerts.ac.uk; 148 pages; retrieved on Nov. 30, 2022 (Year: 2015).*

X. Liu and H. Zhong. Mining stackoverflow for program repair. In 2018 IEEE 25th International Conference on Software Analysis, Evolution and Reengineering (SANER). 118-129. Mar. 2018.

Qing Gao, Hansheng Zhang, Jie Wang, Yingfei Xiong, Lu Zhang, and Hong Mei. Fixing Recurring Crash Bugs via Analyzing Q&A Sites. In Proceedings of the 2015 30th IEEE/ACM International Conference on Automated Software Engineering (ASE) (ASE '15). IEEE Computer Society, Washington, DC, USA, 307-318. Nov. 2015.

(Continued)

*Primary Examiner* — S. Sough
*Assistant Examiner* — Cuong V Luu
(74) *Attorney, Agent, or Firm* — Maschoff Brennan

(57) ABSTRACT

Operations include obtaining a first patch that corrects a first error in a first buggy code snippet of first source code based on the first buggy code snippet and a first repaired code snippet. The operations also include generating a second patch based on the first patch and a bug pattern of a bug scenario that corresponds to the first error. In addition, the operations include generating a third patch based on the second patch, the bug pattern, and a second buggy code snippet of second source code, the third patch correcting a second error in the second buggy code snippet. Moreover, the operations include performing one or more repair operations with respect to the second buggy code snippet based on the third patch.

20 Claims, 11 Drawing Sheets

(56) References Cited

OTHER PUBLICATIONS

Westley Weimer, ThanhVu Nguyen, Claire Le Goues, and Stephanie Forrest. 2009. Automatically Finding Patches Using Genetic Programming. In Proceedings of the 31st International Conference on Software Engineering (ICSE). 364-374. May 2009.

Zichao Qi, Fan Long, Sara Achour, and Martin Rinard. 2015. An analysis of patch plausibility and correctness for generate-and-validate patch generation systems. In Proceedings of the 2015 International Symposium on Software Testing and Analysis (ISSTA 2015). Association for Computing Machinery, New York, NY, USA, 24-36. Jul. 2015.

Fan Long and Martin Rinard. 2016. Automatic patch generation by learning correct code. In Proceedings of the 43rd Annual ACM SIGPLAN-SIGACT Symposium on Principles of Programming Languages (POPL '16). Association for Computing Machinery, New York, NY, USA, 298-312. Apr. 2016.

D. Kim, J. Nam, J. Song and S. Kim, "Automatic patch generation learned from human-written patches," 2013 35th International Conference on Software Engineering (ICSE), San Francisco, CA, 2013, pp. 802-811. May 2013.

Thomas Durieux, Benoit Cornu, Lionel Seinturier, and Martin Monperrus. 2017. Dynamic Patch Generation for Null Pointer Exceptions Using Metaprogramming. In Proceedings of the 24th IEEE International Conference on Software Analysis, Evolution and Reengineering (SANER '17). IEEE, Klagenfurt, Austria, 349-358. Feb. 2017.

Ripon K. Saha, Yingjun Lyu, Hiroaki Yoshida, and Mukul R. Prasad. 2017. ELIXIR: effective object oriented program Yepair. In Proceedings of the 32nd IEEE/ACM International Conference on Automated Software Engineering (ASE 2017). IEEE Press, 648-659. Nov. 2017.

Fan Long, Peter Amidon, and Martin Rinard. 2017. Automatic inference of code transforms for patch generation. Proceedings of the 2017 11th Joint Meeting on Foundations of Software Engineering. Association for Computing Machinery, New York, NY, USA, 727-739. Aug. 2017.

Reudismam Rolim, Gustavo Soares, Loris D'Antoni, Oleksandr Polozov, Sumit Gulwani, Rohit Gheyi, Ryo Suzuki, and Bjorn Hartmann. 2017. Learning syntactic program transformations from examples. In Proceedings of the 39th International Conference on Software Engineering (ICSE '17). IEEE Press, 404-415. May 2017.

Rohan Bavishi, Hiroaki Yoshida, and Mukul R. Prasad. 2019. Phoenix: automated data-driven synthesis of repairs for static analysis violations. In Proceedings of the 2019 27th ACM Joint Meeting on European Software Engineering Conference and Symposium on the Foundations of Software Engineering (ESEC/FSE 2019). Association for Computing Machinery, New York, NY, USA, 613-624. Aug. 2019.

Luca Ponzanelli, Gabriele Bavota, Massimiliano Di Penta, Rocco Oliveto, and Michele Lanza. 2014. Mining StackOverflow to Turn the IDE into a Self-confident Programming Prompter. In Proceedings of the 11th Working Conference on Mining Software Repositories (Hyderabad, India) (MSR 2014). ACM, New York, NY, USA, 102-111 May 2014.

Luca Ponzanelli, Simone Scalabrino, Gabriele Bavota, Andrea Mocci, Rocco Oliveto, Massimiliano Di Penta, and Michele Lanza. 2017. Supporting Software Developers with a Holistic Recommender System. In Proceedings of the 39th International Conference on Software Engineering (Buenos Aires, Argentina) (ICSE '17). IEEE Press, Piscataway, NJ, USA, 94-105. Jul. 2017.

Tianyi Zhang, Di Yang, Crista Lopes, and Miryung Kim. 2019. Analyzing and Supporting Adaptation of Online Code Examples. In Proceedings of the 41st International Conference on Software Engineering (Montreal, Quebec, Canada) (ICSE '19). IEEE Press, Piscataway, NJ, USA, May 2019.

Sifei Luan, Di Yang, Celeste Barnaby, Koushik Sen, and Satish Chandra. 2019. Aroma: Code Recommendation via Structural Code Search. Proc. ACM Program.Lang. 3, OOPSLA, Article 152 (Oct. 2019), 28 pages.

Kisub Kim, Dongsun Kim, Tegawendé F. Bissyandé, Eunjong Choi, Li Li, Jacques Klein, and Yves Le Traon. 2018. FaCoY: A Code-to-code Search Engine. In Proceedings of the 40th International Conference on Software Engineering (Gothenburg, Sweden) (ICSE '18). ACM, New York, NY, USA, 946-957; May 2018.

Fuxiang Chen and Sunghun Kim. 2015. Crowd Debugging. In Proceedings of the 2015 10th Joint Meeting on Foundations of Software Engineering (ESEC/FSE '15). ACM, New York, NY, USA; Aug. 2015.

Di Yang, Aftab Hussain, and Cristina Videira Lopes. 2016. From Query to Usable Code: An Analysis of Stack Overflow Code Snippets. In Proceedings of the 13th International Conference on Mining Software Repositories (MSR '16). May 2016.

Valerio Terragni, Yepang Liu, and Shing-Chi Cheung. 2016. CSNIPPEX: Automated Synthesis of Compilable Code Snippets from Q&A Sites. In Proceedings of the 25th International Symposium on Software Testing and Analysis (ISSTA 2016). ACM, New York, NY, USA, 118-129. May 2016.

Siddharth Subramanian, Laura Inozemtseva, and Reid Holmes. 2014. Live API Documentation. In Proceedings of the 36th International Conference on Software Engineering (ICSE '14) ACM, May 2014.

Hao Zhong and Zhendong Su. 2013. Detecting API Documentation Errors. In Proceedings of the 2013 ACM SIGPLAN International Conference on Object Oriented Programming Systems Languages & Applications (OOPSLA '13). Oct. 2013.

Barthelemy Dagenais and Martin P. Robillard. 2012. Recovering Traceability Links between an API and Its Learning Resources. In Proceedings of the 34th International Conference on Software Engineering (ICSE '12). IEEE Press. Jun. 2012.

EP Search Report in Application No. 21195026.6 dated Feb. 2, 2022.

Sakkas, G. et al., "Type Error Feedback via Analytic Program Repair" PLDI '20, Jun. 15, 2020.

* cited by examiner

160 UnsupportedOperationException

```
List $v = Arrays.asList(*);
$v.__{add|remove|clear|addAll|removeAll}__(*);
```

```
List $v = Collections.singletonList(*);
$v.__{add|remove|clear|addAll|removeAll}__(*);
```

```
CopyOnWriteArrayList $v;
Collections.sort($v);
```

162 ConcurrentModificationException

```
__{Collection, List, Map, Set}__ $v;
loop($v) {
    $v.__{add, remove, clear, addAll, removeall}__(*);
}
```

```
Iterator $v1 = __{Collection, List, Map, Set}__.iterator();
loop($v1.hasNext()) {
    *$v2 = $v1.next();
    $v1.remove();
}
```

164 ClassCastException

```
List $v1;
*[] $v2 = (*[]) $v1.toArray();
```

```
URL $v1;
(HttpURLConnection) $v1.openConnection();
```

```
* $v;
(__{Long, Double, Integer}__) $v;
```

```
String $v1; * $v2;
String.format($v1, $v2);
```

```
(Activity) *.getContext();
```

166 IllegalArgumentException

```
ProgressDialog $v;
$v.dismiss();
```

```
Object $v1;
$v1.wait(NEGATIVE);
```

```
String $v1, $v2;
URLDecoder.decode($v1, $v2);
```

*FIG. 1B*

AUTOMATED GENERATION OF SOFTWARE PATCHES

FIELD

The embodiments discussed in the present disclosure are related to automated generation of software patches.

BACKGROUND

Software developer forums present a rich, hybrid knowledge base of natural language descriptions and code snippets related to developing software programs such as fixing errors (also referred to as bugs or errors) in the software programs. Software development tools may be configured to perform machine analysis operations to analyze posts of the forums to identify which posts may be relevant to correcting particular errors.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

Operations may include obtaining a first patch that corrects a first error in a first buggy code snippet of first source code based on the first buggy code snippet and the first repaired code snippet. The operations may also include generating a second patch based on the first patch and a bug pattern of a bug scenario that corresponds to the first error. In addition, the operations may include generating a third patch based on the second patch, the bug pattern, and a second buggy code snippet of second source code, the third patch correcting a second error in the second buggy code snippet. Moreover, the operations may include performing one or more repair operations with respect to the second buggy code snippet based on the third patch. The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1B illustrates example bug patterns for example types of errors that may be included in the bug pattern library of FIG. 1A;

DESCRIPTION OF EMBODIMENTS

Some embodiments described in the present disclosure relate to methods and systems of generating patches for errors (also referred to as bugs or violations) in software programs based on posts within developer forums in which the posts may describe how to correct certain types of errors in the software programs. In particular, as described in detail below, a computing system may be configured to obtain a first concrete patch from a particular post on a website of a developer forum. Additionally, a generalized patch may be generated based on the first concrete patch by abstracting elements of the first concrete patch. The generalized patch may be used to correct various buggy code snippets and generated based on bug patterns of relatively common bug scenarios, which may be stored in a library. Further, a second concrete patch may be generated for a particular error in code under test of a software program. The second concrete patch may be generated based on the generalized patch by concretizing the abstractions of the generalized patch according to the context of the code under test. The second concrete patch may then be used to correct the particular error in the code under test.

In the present disclosure, reference to "concrete" with respect to patches or code elements refers to code snippets and/or code elements that are specific to the code of a specific software program. Additionally, reference to "generalized" with respect to patches or code elements refers to code snippets and/or code elements that have been genericized such that the patches or code elements are generic to more than one software program.

As such, according to one or more embodiments of the present disclosure, the technological field of software development may be improved by configuring a computer system in a manner in which the computing system is able to generate patches specific to the code under test based on posts of developer forums.

Embodiments of the present disclosure are explained with reference to the accompanying drawings.

Figure 1A:
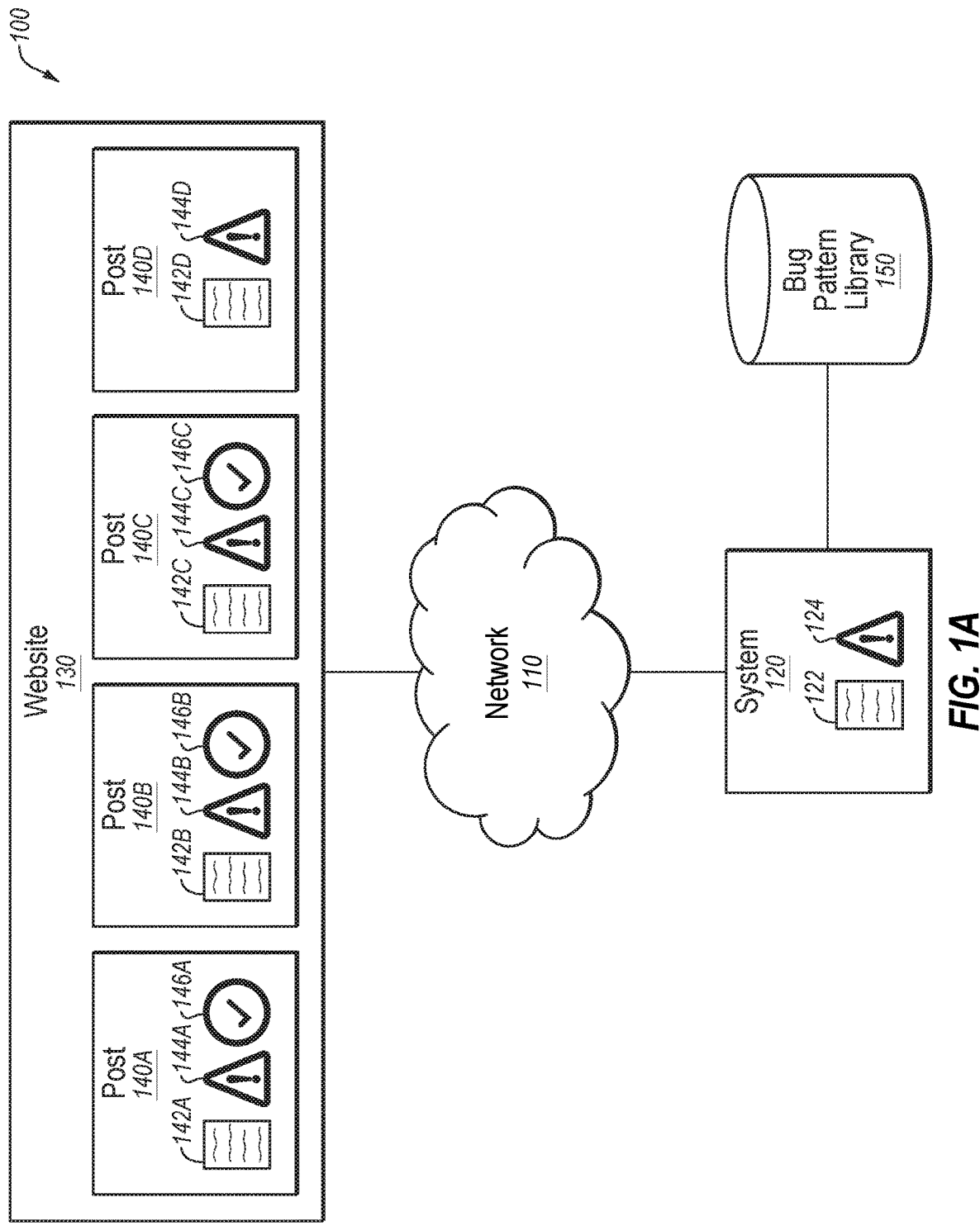
FIG. 1A is a diagram representing an example environment related to automated generation of software patches.

FIG. 1A is a diagram representing an example environment 100 related to automated generation of software patches, arranged in accordance with at least one embodiment described in the present disclosure. The environment 100 may include a network 110, a system 120, and a website 130.

The network 110 may include any communication network configured for communication of signals between any of the components (e.g., the system 120 and the website 130) of the environment 100. The network 110 may be wired or wireless. The network 110 may have numerous configurations including a star configuration, a token ring configuration, or another suitable configuration. Furthermore, the network 110 may include a local area network (LAN), a wide area network (WAN) (e.g., the Internet), and/or other interconnected data paths across which multiple devices may communicate. In some embodiments, the network 110 may include a peer-to-peer network. The network 110 may also be coupled to or include portions of a telecommunications network that may enable communication of data in a variety of different communication protocols.

In some embodiments, the network 110 includes or is configured to include a BLUETOOTH® communication network, a Z-Wave® communication network, an Insteon® communication network, an EnOcean® communication network, a wireless fidelity (Wi-Fi) communication network, a ZigBee communication network, a HomePlug communication network, a Power-line Communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 110 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the system 120, the website 130, a cloud server communication, or a gateway.

The system 120 may include a computer-based hardware system that includes a processor, memory, and communication capabilities. The system 120 may be coupled to the network 110 to communicate data with any of the other components of the environment 100. Some examples of the system 120 may include a mobile phone, a smartphone, a tablet computer, a laptop computer, a desktop computer, a set-top box, a virtual-reality device, or a connected device, etc. Additionally or alternatively, the system 120 may include one or more processor-based computing systems. For example, the system 120 may include one or more hardware servers or other processor-based computing devices configured to function as a server. The system 120 may include memory and network communication capabilities. In some embodiments, the system 120 may include a computing system such as described below with respect to FIG. 2.

In some embodiments, the system 120 may include code under test 122 ("code 122") of a software program. In these and other embodiments, the code 122 may include source code written in any programming language such as, for example, C++, C, assembly, C#, Java, BASIC, JavaScript, Python, and SQL, among others. In some embodiments, the code 122 may include multiple methods. In these and other embodiments, a method may be a discrete sub-program inside the code 122 which may be independently executable and/or distinct. For example, a method may be a sub-unit of the code 122. In these and other embodiments, the code 122 may be designed for a particular purpose and/or to achieve a particular goal. In some embodiments, the code 122 may be all of the code of the software program. Additionally or alternatively, the code 122 may be a portion of the code of the software program.

In some embodiments, the code 122 may include a buggy code snippet that includes an error 124. While a single error 124 is depicted in FIG. 1, the code 122 may include any number of errors 124. In some embodiments, the errors 124 may include compilation errors, run-time errors, logic errors, and/or other errors. For example, in some embodiments, the error 124 may include a syntax error that may be detected by a compiler prior to execution of a program based on the code 122. For example, punctuation marks may be missing in the code 122 and/or a variable may be used without being declared. Alternatively or additionally, in some embodiments, the error 124 may include a run-time error. In these and other embodiments, the code 122 may compile without any errors but errors may be encountered when attempting to execute the compiled code 122. For example, the code 122 may include division by zero or an attempt to access an element of an array that does not exist. Alternatively or additionally, in some embodiments, the error 124 may include a logic error. In these and other embodiments, the code 122 may compile without any errors and no errors may be encountered when attempting to execute the compiled code 122. However, the code 122 may not function as anticipated by an author or designer of the code 122. In such instances, the error 124 may include lines of code that cause the code 122 to not function as anticipated.

In some embodiments, the error 124 may include different characteristics. For example, the error 124 may include a name of the error 124. Alternatively or additionally, in some embodiments, the error 124 may include a description of the error 124. For example, the description of the error 124 may include a type of the error 124. Alternatively or additionally, the error 124 may include a programming language. For example, the programming language may of the error 124 may be the same as the programming language of the code 122. As an example, the error 124 may include a run-time exception. The name of the run-time exception may be "java.lang.ArrayIndexOutOfBoundsException." The description of the exception may be "Index 10 out of bounds for length 10." The type for the exception may be an out-of-bounds exception. The programming language for the exception may be the Java programming language.

The website 130 may include any applicable website on the Internet. Alternatively or additionally, in some embodiments the website 130 may include an internal repository or resource, such as a collection of documents on an internal intranet site. For example, in some embodiments, the website 130 may include a discussion forum where users may post questions and other users may post answers. For example, one user may post a question in the form of a software program that includes an error and another user may post an answer or patch to the question in the form of a corrected software program that no longer includes the error. In these and other embodiments, multiple users may post answers to the question and/or one user may post multiple answers. In some embodiments, the user who posted the question may select one answer as resolving the error the user experienced. In some embodiments, users of the website 130 may vote on different answers posted by users. While FIG. 1A depicts a single website 130, in some embodiments there may be multiple websites 130. In some embodiments, the website 130 may include multiple pages or multiple posts, such as the post 140A, the post 140B, the post 140C, and the post 140D (collectively the posts 140). While the website 130 is depicted with four posts 140, in some embodiments, the website 130 may include hundreds of posts 140, thousands of posts 140, hundreds of thousands of posts 140, or any number of posts 140. Furthermore, while the posts 140 are depicted as being associated with a single website 130, in some embodiments, some of the posts 140 may be associated with a first website and other posts 140 may be associated with a second website. For example, the post 140A and the post 140B may be associated with the website 130 while the post 140C and the post 140D may be associated with a different website.

In these and other embodiments, the posts 140 may each be associated with different software programs. In some embodiments, reference to the software programs may include references to lines of code of the associated software programs. For example, the software program may include multiple lines of a larger software program and may not include every line in the larger software program. In some embodiments, the software programs may be the lines of code in larger software programs that include errors. Thus, references to the software programs is not limited to entire programs. In these and other embodiments, the software programs of the posts 140 may each differ from each other and may differ from the code 122. For example, the software programs of the posts 140 may each have a different purpose, have a different author, be written in a different programming language, or include different error types than the code 122.

In some embodiments, the posts 140 may be associated with different questions. For example, a user of the website 130 may create the post 140A on the website 130. As part of the post 140A, the user may add a buggy code snippet 142A and may ask a question associated with the buggy code snippet 142A. For example, the user may have experienced an error while writing the software program that includes the buggy code snippet 142A. To obtain assistance, the user may post the buggy code snippet 142A to the website 130 as part of the post 140A. The user may write a question to ask other users of the website 130 how the user may remediate the error and/or ask other users what is causing the error in the buggy code snippet 142A. The posts 140B, 140C, and 140D may similarly include buggy code snippets 142B, 142C, and 142D, respectively.

In some embodiments, the buggy code snippet 142A may include an error 144A, the buggy code snippet 142B may include an error 144B, the buggy code snippet 142C may include an error 144C, and the buggy code snippet 142D may include an error 144D (collectively the errors 144). In some embodiments, each of the errors 144 may be different errors from each other. For example, the error 144A may be a run-time error, the error 144B may be a logic error, the error 144C may be a compilation error, and the error 144D may be a run-time error distinct from the error 144A. Alternatively or additionally, in some embodiments, one or more of the errors 144 may be the same error, may be related errors, and/or may be similar errors. For example, in some embodiments, the error 144A may be an index out of bounds error in the C++ programming language while the error 144C may be an index out of bounds error in the Java programming language. In this example, the error 144A and the error 144C may be similar errors. In some embodiments, errors 144 may be determined to be similar errors even if the errors are manifested and/or handled differently in different environments. For example, an array index out of bounds access may be manifested and handled differently during runtime in a C++ environment verses a Java environment, even though the root cause of the behavior may be the same, i.e. attempting to access an array out of its prescribed bound of indices.

In some embodiments, one or more of the posts 140 may include a repaired code snippet that may correct the corresponding error 144 of the corresponding buggy code snippet. For example, the post 140A may include a repaired code snippet 146A that corrects the error 144A, the post 140B may include a repaired code snippet 146B that corrects the error 144B, and the post 140C may include a repaired code snippet 146C that corrects the error 144C. The repaired code snippets 146A, 146B, and/or 146C may be collectively or generally referred to as the repaired code snippets 146.

The changes between the buggy code snippets 142 and the corresponding repaired code snippets 146 of one or more of the posts 140 may be referred to as patches that repair the corresponding errors 144. In some embodiments, one or more of the posts 140 may explicitly include the patches along with the corresponding repaired code snippet 146. Additionally or alternatively, one or more of the posts 140 may include only the patch or only the corresponding repaired code snippet 146. In some embodiments, as discussed in further detail below with respect to FIG. 4, one or more of the patches may be derived from a particular buggy code snippet and a corresponding repaired code snippet. In these or other embodiments, one or more posts 140 may not include an associated repaired code snippet 146 and/or patch. For example, the post 140D may not include a repaired code snippet or corresponding patch.

In some embodiments, the patches may each include an edit script that indicates the changes to make to the corresponding buggy code snippet to obtain the corresponding repaired code snippet. The edit script may include one or more lines that each indicate a respective change. The indication may indicate a respective portion of the buggy code snippet that may correspond to the respective change, the type of change to make, a respective portion of the repaired code snippet that corresponds to the respective change, and the relationship between the respective portion of the buggy code snippet and the respective portion of the repaired code snippet.

A description of the operation of environment 100 follows. A user may write the code 122 using the system 120. While writing the code 122 or while testing the code 122, the user may receive a notification of an error 124 such that the code 122 may include a buggy code snippet.

In some embodiments, the system 120 may then perform a search of a website 130 using a search query based on characteristics of the error 124 such as a name of the error 124, a type of the error 124, and/or a programming language associated with the code 122 and/or the error 124. In some embodiments, the search query may include tags to indicate whether the search should include unanswered posts 140, answered posts 140, or both unanswered and answered posts 140. Based on the search query, a set of posts 140 may be identified. For example, the set of posts 140 may be identified based on each post in the set of posts including an answer to a question, the question in the posts including a code snippet with an error with the same type and/or the same name as the error characteristics of the error 124, and the code snippet in the post being written in the same programming language as the error 124. The search may be considered a coarse search.

In these or other embodiments, one or more of the posts of the set of posts 140 may include a buggy code snippet and a corresponding repaired code snippet. Additionally or alternatively, one or more of the posts of the set of posts may include a patch for the error of the corresponding post.

The system 120 may be configured to select a particular post 140 of the set of posts 140 and obtain a first concrete patch from the particular post. In some embodiments, the system 120 may be configured to select the particular post 140 according to one or more operations described with respect to U.S. patent application Ser. No. 16/985,171 filed on Aug. 4, 2020 and incorporated by reference in the present disclosure its entirety.

In some embodiments, the particular post 140 may include a first edit script of the patch disclosed therein and the system 120 may obtain, as the first concrete patch, the first edit script as included in the particular post 140. Additionally or alternatively, the system 120 may be configured to determine the first edit script of the particular patch based on the buggy code snippet 142 and the repaired code snippet 146 of the particular post 140. For example, in some embodiments, as the system 120 may be configured to obtain the first concrete patch by obtaining the first edit script using one or more operations of the method 400 of FIG. 4.

In these or other embodiments, the system 120 may be configured to access a bug pattern library 150. The bug pattern library 150 may be stored via any suitable computer-readable media and may be communicatively coupled to the system 120 (e.g., directly coupled and/or via the network 110). The bug pattern library 150 may include different patterns (referred to as "bug patterns") of scenarios (referred to as "bug scenarios") that may lead to different types of errors. The bug scenarios may include different conditions or characteristics of source code that may lead to a respective type of bug occurring in a corresponding software program. The bug patterns may relate to corresponding bug scenarios in that the respective bug patterns may indicate the relationships between the different conditions or characteristics of the bug scenarios to which the bug patterns may correspond.

In some embodiments, the bug patterns and corresponding bug scenarios of the bug pattern library 150 may include common scenarios that may lead to common types of errors. For example, some example scenarios may include unsupported operation exceptions, concurrent modification exceptions, class cast exceptions, illegal arguments exceptions, etc.

In some embodiments, the bug patterns of the bug pattern library 150 may be formatted according to a particular domain specific language (DSL) that is based on a syntax of a particular software language. For example, one or more bug patterns of the bug pattern library 150 that may provide bug scenarios related to Java may be formatted according to a particular DSL that is based on a Java-like syntax. In some embodiments, the bug pattern library 150 may include bug patterns formatted according to different DSL's that correspond to different software languages. In these or other embodiments, different bug patterns may correspond to same types of bugs but may be formatted according to different DSL's. Additionally or alternatively, some bug patterns may be specific to certain types of software languages and may therefore such bug patterns may only be formatted according to the respective DSL's of the software languages to which they may relate. The formatting of the bug patterns according to certain DSLs may be such that the bug patterns may be structured as genericized code snippets of source code of corresponding software programs.

In these or other embodiments, the formats of the DSL's may have some differences as compared to the syntax of the corresponding software language. For example, some of the syntax rules may be relaxed in a particular DSL as compared to a corresponding software language. For instance, a Java DSL may not have some of the strict formalism of Java such as enclosure of statements in a method and/or class.

As another example, the particular DSL may support semantic abstractions in which a particular semantic abstraction may be used to represent different program elements that are semantically equivalent with respect to each other in the context of the bug scenario of the respective bug pattern and in the context of the type of bug. In other words, the semantic abstractions encode a family of program elements that play an equivalent role for a specific kind of bug and its bug scenario, but may not be generally equivalent to each other.

For example, FIG. 1B illustrates an example bug pattern 160 for an unsupported operation exception, which may be a runtime exception bug. In the bug pattern 160, the methods "add( )", "remove( )", "clear( )" "addAll( )", and "removeAll" may each be deemed as semantic equivalents because in the context of an unsupported operation exception each of these methods represent a structural modification of a given "List" by adding or removing one or more of the elements of the "List." However, generally speaking some of the methods are actually performing different or even opposite operations—e.g., "add( )" and "remove( )" are actually performing opposite operations—and thus may not be considered semantic equivalents outside of the context of the bug scenario of the bug pattern 160.

Additionally or alternatively, the particular DSL may support a wildcard character that may match different program elements that may differ in one or more ways. For example, in the bug pattern 160 of FIG. 1B, the argument to the method "Arrays.asList( )" is a wildcard "*", as it may represent different program elements such as variables, creation of new array objects, or a return from a method call.

In these or other embodiments, the particular DSL may support numeric constraints on values. For example, FIG. 1B illustrates an example bug pattern 166 of an illegal argument exception. An argument to a method "wait( )" of the bug pattern 166 is a number value in which an illegal argument exception may occur if this value is less than zero. To represent this scenario, the argument to the method "wait( )" is specified with the numeric constraint of "NEGATIVE".

As indicated above, FIG. 1B illustrates some example bug patterns for some example types of errors that may be included in the bug pattern library 150 and that may be configured according to a Java DSL. For example, FIG. 1B illustrates the example bug pattern 160 for an unsupported operation exception, an example bug pattern 162 for a concurrent modification exception, an example bug pattern 164 for a class cast exception, and the example bug pattern 166 for an illegal argument exception, which may each be errors associated with Java code.

As indicated above, the system 120 may be configured to access the bug pattern library 150 to obtain one or more of the bug patterns included therein. In these or other embodiments, the system 120 may be configured to select a particular bug pattern that may be most related to the buggy code snippet of the software program that relates to the error 124. The system 120 may select the particular bug pattern as described according to U.S. patent application Ser. No. 16/985,171 in some embodiments.

Figure 4:
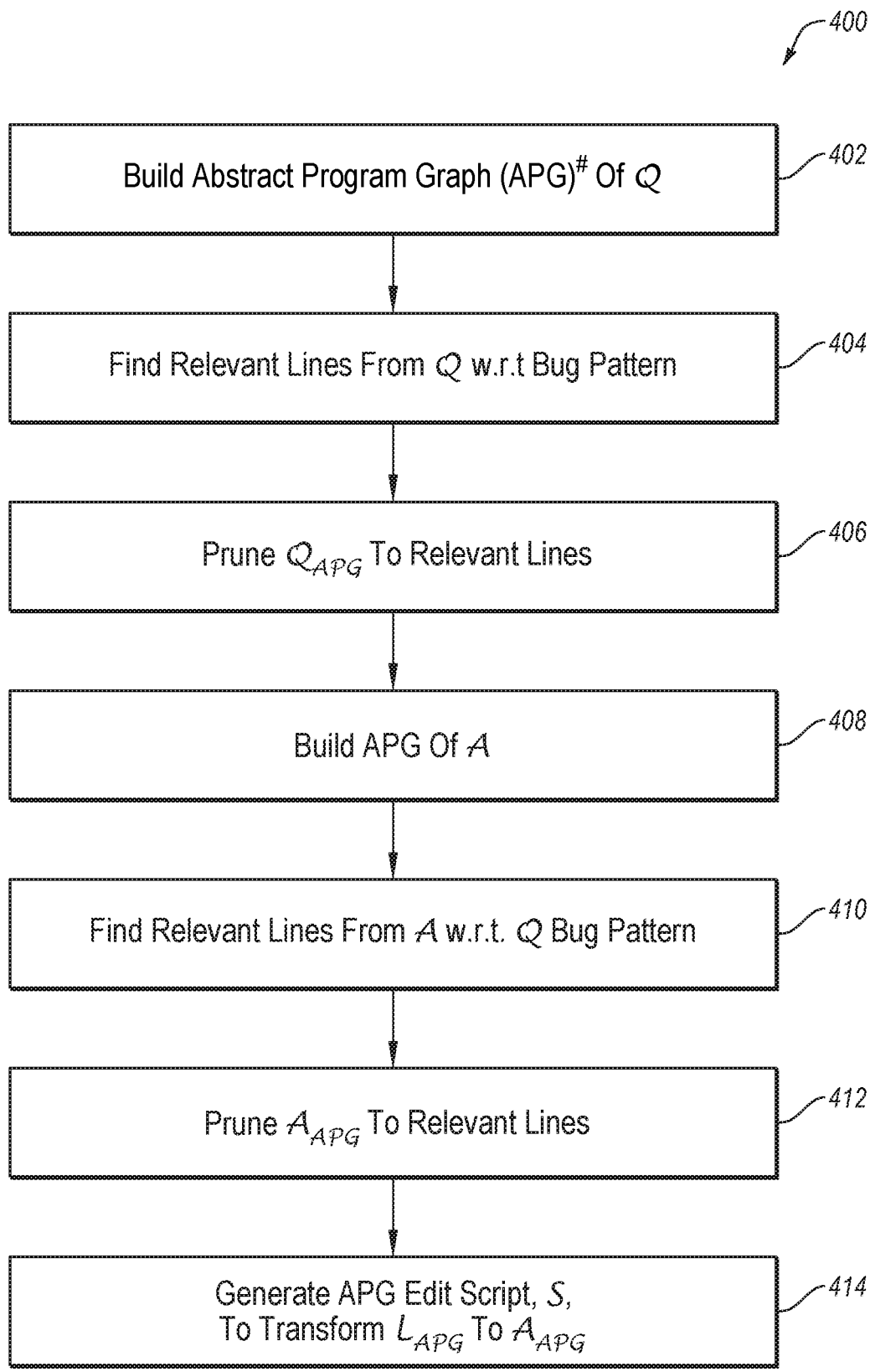
FIG. 4 is a flowchart of an example method of generating a concrete patch from a buggy code snippet.

In some embodiments, the system 120 may be configured to use the particular bug pattern to determine the first concrete patch, such as described with respect to FIG. 4. Additionally or alternatively, the system 120 may be configured to generate a generalized patch based on the first concrete patch and the particular bug pattern. The generalized patch may be generated by changing concrete elements in the first edit script of the first concrete patch to more abstract/general elements. In some embodiments, the system 120 may be configured to generate the generalized patch based on the first concrete patch and the particular bug pattern using one or more operations described below with respect to FIG. 5.

In these or other embodiments, the system 120 may be configured to generate a second concrete patch that may include changes to make to the code 122 to correct the error 124. The system 120 may generate the second concrete patch based on the generalized patch, the code 122 and the particular bug pattern to concretize the abstractions of the generalized patch according to the specifics of the code 122. For example, the generic elements of the edit script of the generalized patch may be changed to corresponding specific elements of the code 122 to convert the generalized edit script of the generalized patch into a second edit script of the second concrete patch. In some embodiments, the system 120 may be configured to generate the second concrete patch using one or more operations described below with respect to FIG. 6.

The system 120 may also be configured to perform, based on the second concrete patch, one or more repair operations with respect to the buggy code snippet of the code 122 to correct the error 124. For example, the system 120 may change the buggy code snippet of the code 122 according to the second edit script of the second concrete patch to generate a second repaired code snippet, which may be included in the code 122. In some embodiments, the system 120 may change the buggy code snippet using one or more operations described below with respect to FIG. 6. Additionally or alternatively, the repair operations may include presenting the second concrete patch to the user without applying the second concrete patch to the buggy code snippet of the code 122.

Modifications, additions, or omissions may be made to FIG. 1A without departing from the scope of the present disclosure. For example, the environment 100 may include more or fewer elements than those illustrated and described in the present disclosure. Moreover, in some embodiments, the code 122 may be created and edited using a device or system different from the system 120. For example, in these and other embodiments, the user may use a system or device other than the system 120 to create and/or edit the code 122 and the system 120 may perform a search of the website 130 and identify posts 140 based on the error 124.

Alternatively or additionally, in some embodiments, the system 120 and the operations discussed relative to the system 120 may be performed by a single device or distributed across different systems. In these and other embodiments, the environment 100 may include the network 110 and one or more systems, including the system 120 and the website 130, which may be communicatively coupled via the network 110.

Figure 2:
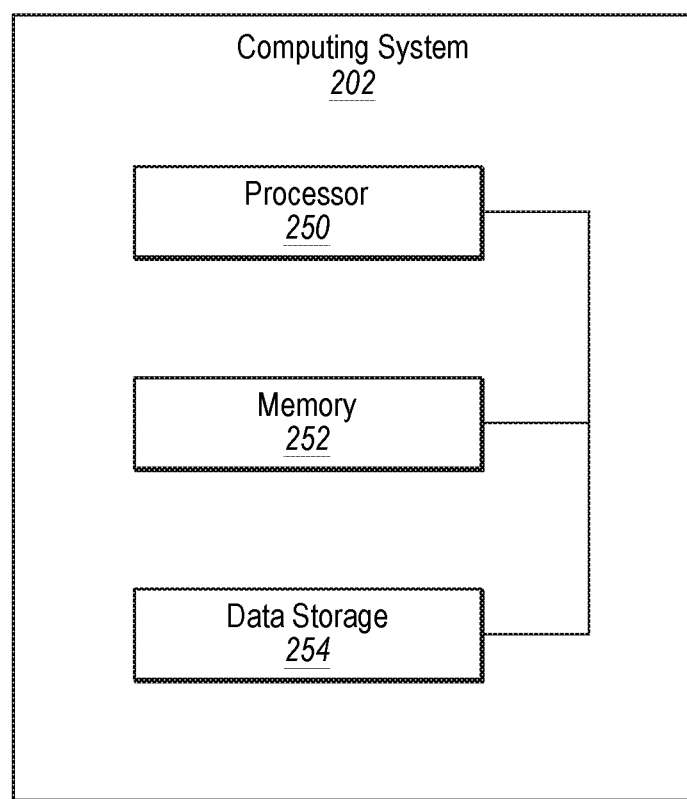
FIG. 2 illustrates a block diagram of an example computing system that may be used to generate software patches.

FIG. 2 illustrates a block diagram of an example computing system 202 that may be used to generate software patches, according to at least one embodiment of the present disclosure. The computing system 202 may be configured to implement or direct one or more operations associated with the system 120 of FIG. 1A, in some embodiments. The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, a module configured to generate software patches may be included in the data storage 254 as program instructions. The processor 250 may fetch the program instructions of the module from the data storage 254 and may load the program instructions of the module in the memory 252. After the program instructions of the module are loaded into memory 252, the processor 250 may execute the program instructions such that the computing system may implement the operations associated with the module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
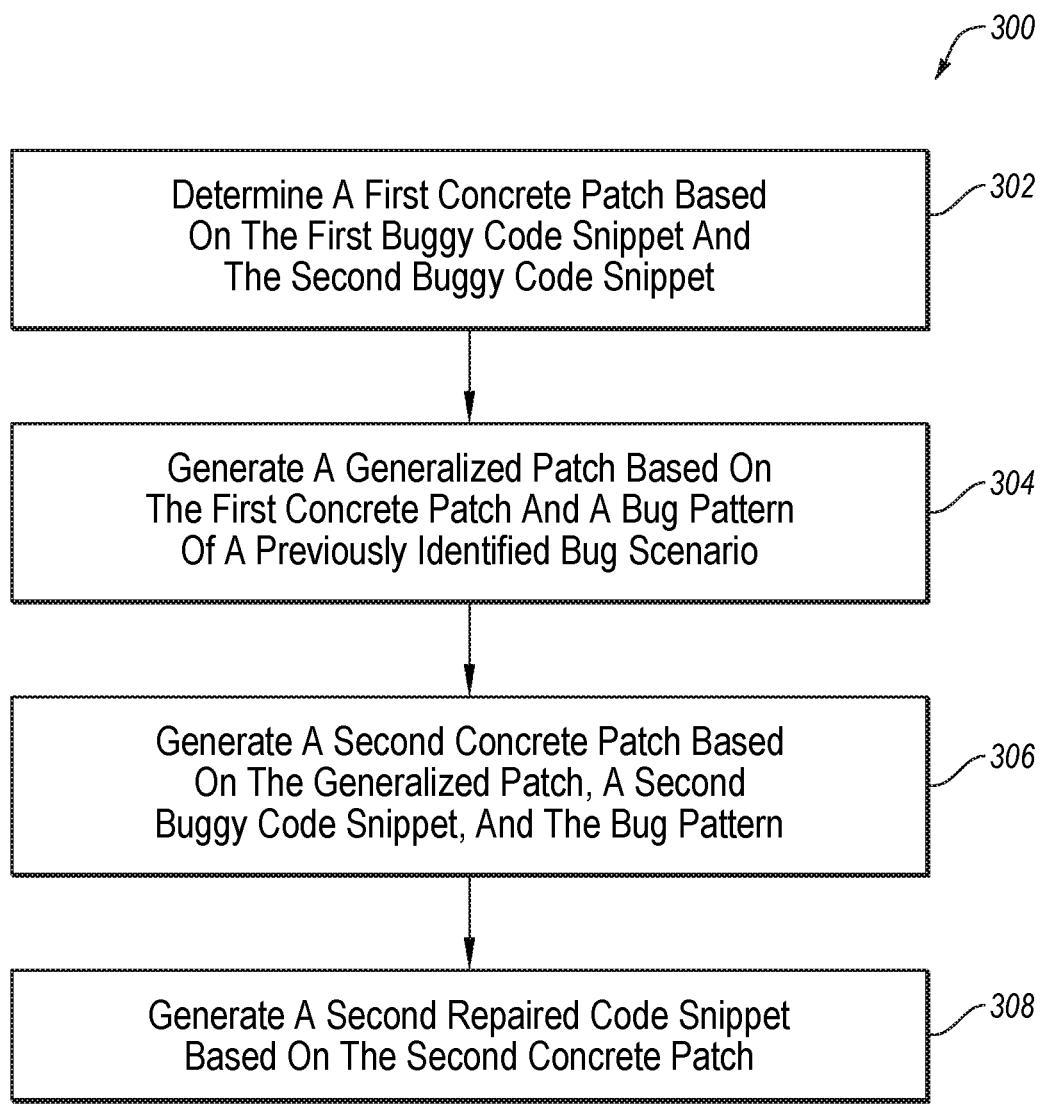
FIG. 3 is a flowchart of an example method of repairing a buggy code snippet.

FIG. 3 is a flowchart of an example method 300 of repairing a buggy code snippet, according to at least one embodiment described in the present disclosure. The method 300 may be performed by any suitable system, apparatus, or device with respect to code under test of a software program. The code under test may include a portion or all of the source code of the software program. By way of example, the system 120 of FIG. 1A, or the computing system 202 of FIG. 2 (e.g., as directed by a module in some embodiments) may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

At block 302, a first concrete patch may be obtained. The first concrete patch may be configured to correct a first error in first source code. In some embodiments, the first concrete patch may be obtained based on a first buggy code snippet and a first repaired code snippet of first source code. The first buggy code snippet may include the first error and the first error may be corrected in the first repaired code snippet. In some embodiments, the first concrete patch may be obtained based on a post of a website, such as a developers forum website. In these or other embodiments, the post may explicitly include the first concrete patch. Additionally or alternatively, the post may include the first buggy code snippet (e.g., in a question posted on the forum) and the post may include the first repaired code snippet (e.g., in an answer to the question posted on the forum) and the first concrete patch may be determined from the first buggy code snippet and the first repaired code snippet. In these or other embodiments, the first concrete patch may be determined according to one or more operations described below with respect to FIG. 4.

In some embodiments, the first concrete patch may be obtained based on the first error being determined to be similar to a second error of a second buggy code snippet of the code under test. In these or other embodiments, the post may be identified for obtaining the first concrete patch based on the first error being determined to be similar to the second error. In these or other embodiments, the post may be identified such as described in U.S. patent application Ser. No. 16/985,171.

At block 304 a generalized patch may be generated based on the first concrete patch and a bug pattern of a previously identified bug scenario. The bug pattern may be obtained from a bug pattern library in some embodiments. Additionally or alternatively, the bug pattern may be obtained based on the bug pattern corresponding to the same type of error as the first error and the second error. In some embodiments, the bug pattern may be selected from multiple bug patterns based on a similarity between the bug pattern and the first buggy code snippet and/or the second buggy code snippet. For example, the bug pattern may be selected based on similarities such as described in U.S. patent application Ser. No. 16/985,171.

As indicated above, the generalized patch may be generated by converting concrete elements of the first concrete patch that are specific to the first buggy code snippet and the first repaired code snippet into abstractions that are generalized versions of the elements. In some embodiments, the generalized patch may be generated according to one or more operations described below with respect to FIG. 5.

At block 306, a second concrete patch may be generated based on the generalized patch, the second buggy code snippet, and the bug pattern. As indicated above, the second concrete patch may be generated by converting the abstractions of the generalized patch back into concrete elements that are specific to the second buggy code snippet. In some embodiments, the second concrete patch may be generated according to one or more operations described below with respect to FIG. 6.

At block 308, one or more repair operations may be performed with respect to the second buggy code snippet based on the second concrete patch. For example, in some embodiments, the second concrete patch may be presented as a potential correction of the second error. Additionally or alternatively, a second repaired code snippet may be generated based on the second concrete patch and the second buggy code snippet. As indicated above, the second repaired code snippet may be generated by changing the second buggy code snippet according to the second concrete patch. In some embodiments, the second repaired code snippet may be generated according to one or more operations described below with respect to FIG. 6.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 300 may include additional blocks or fewer blocks. For example, in some embodiments, the method 300 may include one or more operations related to performing repair operations on the code under test based on the selected particular post. For instance, the particular example code snippet of the particular post may include a patch that may be applied to the buggy code snippet. Additionally or alternatively, the particular post may be presented to the developer of the code under test as a providing a potential solution to the particular error of the buggy code snippet.

FIG. 4 is a flowchart of an example method 400 of generating a concrete patch from a buggy code snippet that includes an error and a corresponding repaired code snippet that corrects the error, according to at least one embodiment described in the present disclosure. The method 400 may be performed by any suitable system, apparatus, or device with respect to code under test of a software program. By way of example, the system 120 of FIG. 1A, or the computing system 202 of FIG. 2 (e.g., as directed by a module in some embodiments) may perform one or more of the operations associated with the method 400. Although illustrated with discrete blocks, the steps and operations associated with one or more of the blocks of the method 400 may be divided into additional blocks, combined into fewer blocks, or eliminated, depending on the particular implementation. In some embodiments, one or more of the operations of the method 400 may be performed with respect to block 302 of FIG. 3.

The concrete patch may be the first concrete patch of the method 300 of FIG. 3. Further, the buggy code snippet and the repaired code snippet may be the first buggy code snippet and the first repaired code snippet of the method 300 of FIG. 3. Further, as described in further detail below, the concrete patch may be generated using a bug pattern such as the bug pattern described with respect to the method 300 of FIG. 3. In some embodiments, one or more of the operations of the method 400 may be performed with respect to block 302 of FIG. 3

At block 402, a first abstract program graph (APG) of the buggy code snippet ("$Q$") may be generated. In some embodiments, the first APG may be generated by obtaining an abstract syntax tree of the code snippet. Further, the abstract syntax tree may be modified into the first abstract program graph by a process of simplification, type inference (also referred to as "concretization"), and abstraction of the abstract syntax tree.

As part of simplification, the abstract syntax tree may be parsed and compressed to make the tree compact and readable. In some embodiments, parsing and compressing the abstract syntax tree may include combining multiple nodes of the abstract syntax tree into a single node in a resulting abstract tree representation. For example, an abstract syntax tree may include a node for every token in a software program. For example, the statement in the source "int a;" may be represented in an abstract syntax tree as a series of nodes including statement nodes, expression nodes, variable nodes, etc. As part of simplification, the nodes in the abstract syntax tree associated with the statement in source code "int a;" may be parsed and compressed into a single node in the abstract tree representation, a "declare (int, a)" node. Parsing the source code may include dividing a statement in a source code into a construct, a type (i.e., a variable type), and a variable name. For example, constructs may include functions of statements in source code. For the "declare (int, a)" node above, the construct may be "declare", the type may be "int", and the variable name may be "a". Constructs may include loops such as "for", "foreach", "while", conditions such as "if", declarations and constructors, methods such as "delete" and "insert", etc. Types may include "integers" ("int"), floating point numbers ("float"), strings, Booleans, collections, etc.

During type inference, data types of variables may be inferred. Type inference may include determining an inferred type of a variable based on the usage of the variable in the source code. For example, variables used in loops such as "for" loops may be inferred to be integers even if the variable is not explicitly defined as such in the software program, abstract syntax tree, and/or compressed abstract syntax tree. As an additional example, a statement in the source code may include "if (flag)". The data type of the variable "flag" may not be identified in the source code; however, based on the usage of the variable "flag" in the "if" statement, it may be inferred that "flag" is a variable of the "Boolean" type. Thus, the statement "if (flag)" may be converted in the tree representation to a "root" node, an additional "declare (Boolean, flag)" node, and an "if (flag)" node. Similarly, type inference may involve inferring a method scope or caller and inferring variable values. During type inference, nodes may be added to the abstract tree representation that may not be present in the abstract syntax tree.

During abstraction, differing constructs may be generalized to a single construct. In these and other embodiments, data types of variables may be abstracted. During abstraction, primitive data types, such as integers, floating point numbers, characters, strings, and Booleans, may remain without abstraction. Some data types may include application specific and/or user defined types. These data types may be converted into generic type variables. Alternatively or additionally, during abstraction, identifier names may be abstracted. For example, a first variable name "list" may be abstracted to a name "$v1" and a second variable name "s" may be abstracted to "$v2." Alternatively or additionally, during abstraction, constructs may be generalized. For example, "for", "for-each", and "while" may each be abstracted to a "loop" construct. Additionally or alternatively, during abstraction, duplicate subtrees may be abstracted and refactored.

Additional details regarding the process of simplification, type inference and abstraction of the abstract syntax tree may be found in U.S. patent application Ser. No. 16/550,069, filed on Aug. 23, 2019 and incorporated by reference in the present disclosure in its entirety. Further, the first APG may be generated using any other applicable technique other than that described above.

At block 404, lines of the buggy code snippet that relate to the bug pattern may be identified. For example, in some embodiments, a second APG that represents the bug pattern may be generated. As indicated above, in some embodiments, the bug pattern may include code that relates to a particular bug scenario such that the second APG may be generated using the code. In some embodiments, the second APG may be generated in an analogous manner as the first APG.

In these or other embodiments, the first APG and the second APG may be aligned. Additionally or alternatively, the aligning may be performed to determine an overlap between the first APG and the second APG. The aligning may be performed using any suitable technique. For example, in some embodiments, the aligning may be based on determining tree edit distances between the first APG and the second APG.

In some embodiments, the nodes of the first APG and the second APG that overlap may correspond to lines of the buggy code snippet and lines of the bug pattern that relate to each other. Therefore, in some embodiments, the overlapping nodes may be identified to identify the lines of the buggy code snippet that relate to the bug pattern. Overlapping nodes may also be considered or referred to as "matching nodes".

At block 406, the first APG of the buggy code snippet may be pruned with respect to the identified lines that relate to the bug pattern. For example, the first APG may be pruned to only include nodes that overlap with the second APG of the bug pattern.

Figure 7A:
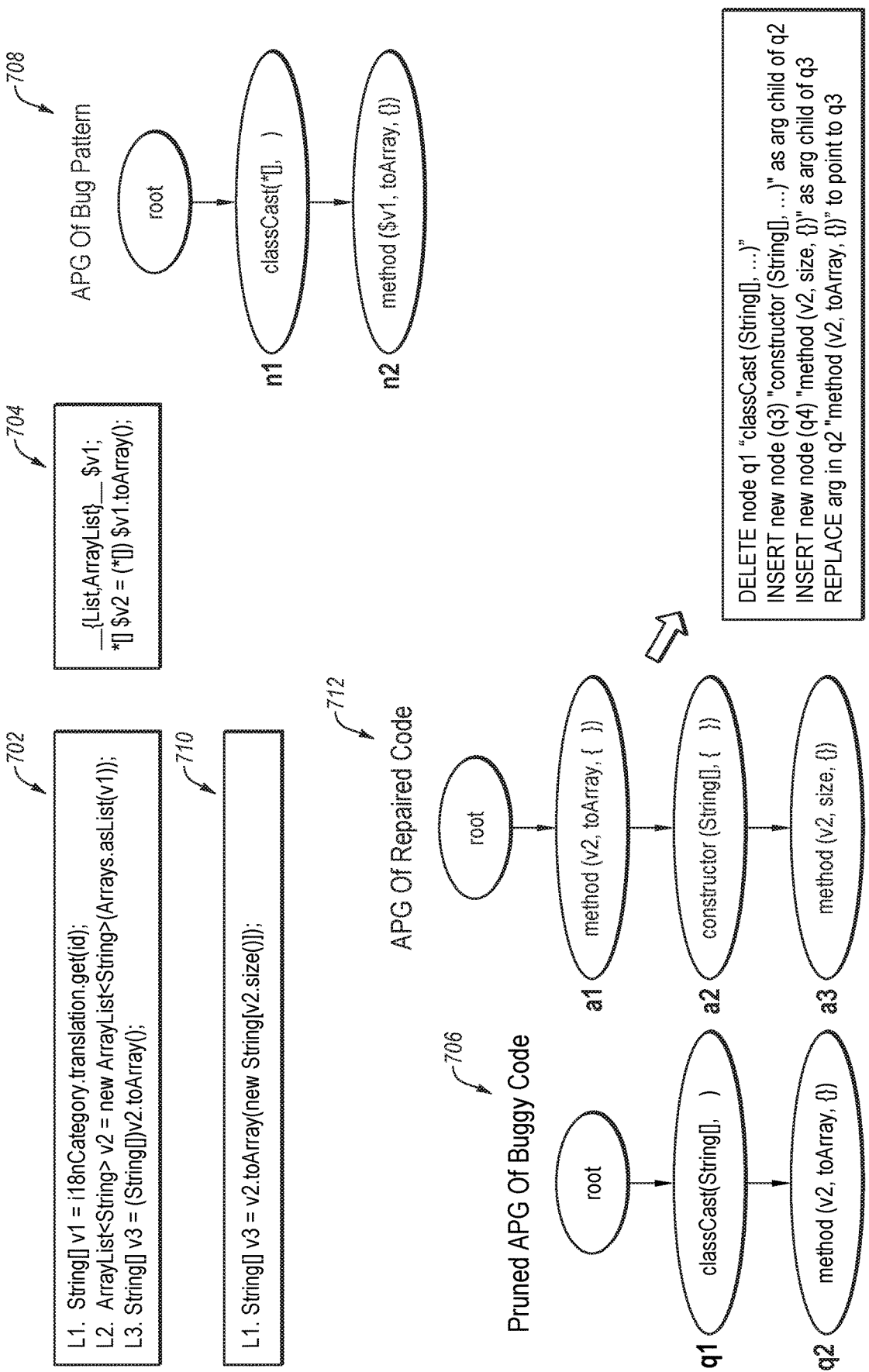
FIG. 7A illustrates an example result of performing one or more operations of the method of FIG. 4.

FIG. 7A illustrates some portions of the operations of blocks 402, 404, and 406. For instance, FIG. 7A illustrates an example buggy code snippet 702 and an example bug pattern 704 A first APG may be generated based on the buggy code snippet 702 and a second APG 708 may also be generated. The initially generated first APG may include nodes that correspond to lines "L1," "L2", and "L3" of the buggy code snippet. However, only the nodes that correspond to line "L3" may overlap with the nodes of the second APG 708. The first APG may accordingly be pruned to only include the overlapping nodes to generate a pruned first APG 706. For instance, the pruned first APG 706 includes nodes "q1" and "q2" that respectively overlap with nodes "n1" and "n2" of the second APG 708.

Returning to FIG. 4, at block 408, a third APG that represents the repaired code snippet ("$A$") may be generated. The third APG may be generated in an analogous manner to the generation of the first APG and/or the second APG in some embodiments.

At block 410, lines of the repaired code snippet that relate to the buggy code snippet (e.g., as pruned) and the bug pattern may be identified. For example, the first APG may be aligned with the third APG to determine which nodes of the first APG and of the third APG overlap with each other. Additionally or alternatively, the second APG may be aligned with the third APG to determine which nodes of the second APG and of the third APG overlap with each other. The lines of the repaired code snippet that correspond to overlapping nodes may be identified as being related to the buggy code snippet and/or related to the bug pattern.

Additionally or alternatively, nodes of the third APG that are connected in the third APG to nodes that match those of the first APG may correspond to lines of the repaired code snippet that relate to the buggy code snippet. For example, a node of the third APG that is a descendant node (e.g., a child node or a grandchild node) of a matching node may correspond to lines of the repaired code snippet that relate to the buggy code snippet.

At block 412, the third APG may be pruned based on the lines that are determined to be related in block 410. For example, the matching nodes and corresponding sub-nodes of the third APG may be maintained while other nodes may be removed.

FIG. 7A also illustrates an example result of performing one or more portions of the operations of blocks 408, 410, and 412. For instance, FIG. 7A also illustrates an example repaired code snippet 710 that corrects the error of the buggy code snippet 702. In addition, FIG. 7A illustrates a third APG 712 of the repaired code snippet 710. The nodes of the third APG 712 correspond to code elements that relate to code elements of one or more nodes of the pruned first APG 706. For example, the third APG 712 includes a node "a1" that matches the node "q2" of the pruned first APG 706. Further, the third APG 712 includes a node "a2" that is a descendent node of node "a1" in that node "a2" corresponds to a code element "constructor (String[ ], . . . )," which is an argument child of the code elements of node "a1." In addition, the third APG 712 includes a node "a3" that is also a descendent of node "a1" in that node "a3" is a descendent of node "a2" (which is a descendent of node "a1") and in which node "a3" corresponds to a code element "method (v2, size, { })," which is an argument child of the code elements of node "a2."

Returning to FIG. 4, at block 414, an APG edit script (" $S$ ") may be generated based on the first APG (" $Q_{APG}$ ") and the third APG (" $Q_{APG}$ "). The APG edit script may indicate the changes that may be made to the first APG to obtain the third APG. In some embodiments, the APG edit script may be the concrete patch that corrects the error of the buggy code snippet. The APG edit script may be generated using any suitable technique. For example, in some embodiments, the APG edit script may be generated using tree edit distances.

In these or other embodiments, the APG edit script may include one or more entries that may each indicate a different change to make to the first APG to obtain the third APG. For example, an entry may be formatted as follows: $s$ =<type, $N_B$, $N_F$, $L_F$ >.

In the above format, "type" may indicate the type of operation made to a buggy node $N_B$ of the first APG. The type of operation may include a "DELETE" operation in which the buggy node $N_B$ is removed, a "REPLACE" operation in which the buggy node $N_B$ is replaced with a repaired node $L_F$, or an "INSERT" operation in which the repaired node $L_F$ is inserted as a sub-node of the buggy node $N_B$. Additionally, $L_F$ may represent the location with respect to $N_B$ that the repaired node $L_F$ is to be inserted/replaced.

FIG. 7A also illustrates an example edit script 714 that may be generated based on the first APG 706 and the third APG 712. The edit script 714 may indicate operations that may be made to the first APG 706 to transform the first APG 706 into the third APG 712.

The method 400 may accordingly be used to determine a concrete patch from an example buggy code snippet and a corresponding repaired code snippet that corrects the error of the example bubby code snippet. Additionally or alternatively, the method 400 may use a bug pattern of a bug pattern library in determining the concrete patch.

One skilled in the art will appreciate that, for this and other processes, operations, and methods disclosed herein, the performance of the functions and/or operations of the method 400 may be implemented in differing order than described. For example, the outlined functions and operations are only provided as examples, and some of the functions and operations may be optional, combined into fewer functions and operations, or expanded into additional functions and operations without detracting from the essence of the disclosed embodiments. In some embodiments, the method 400 may include additional blocks or fewer blocks.

Figure 5:
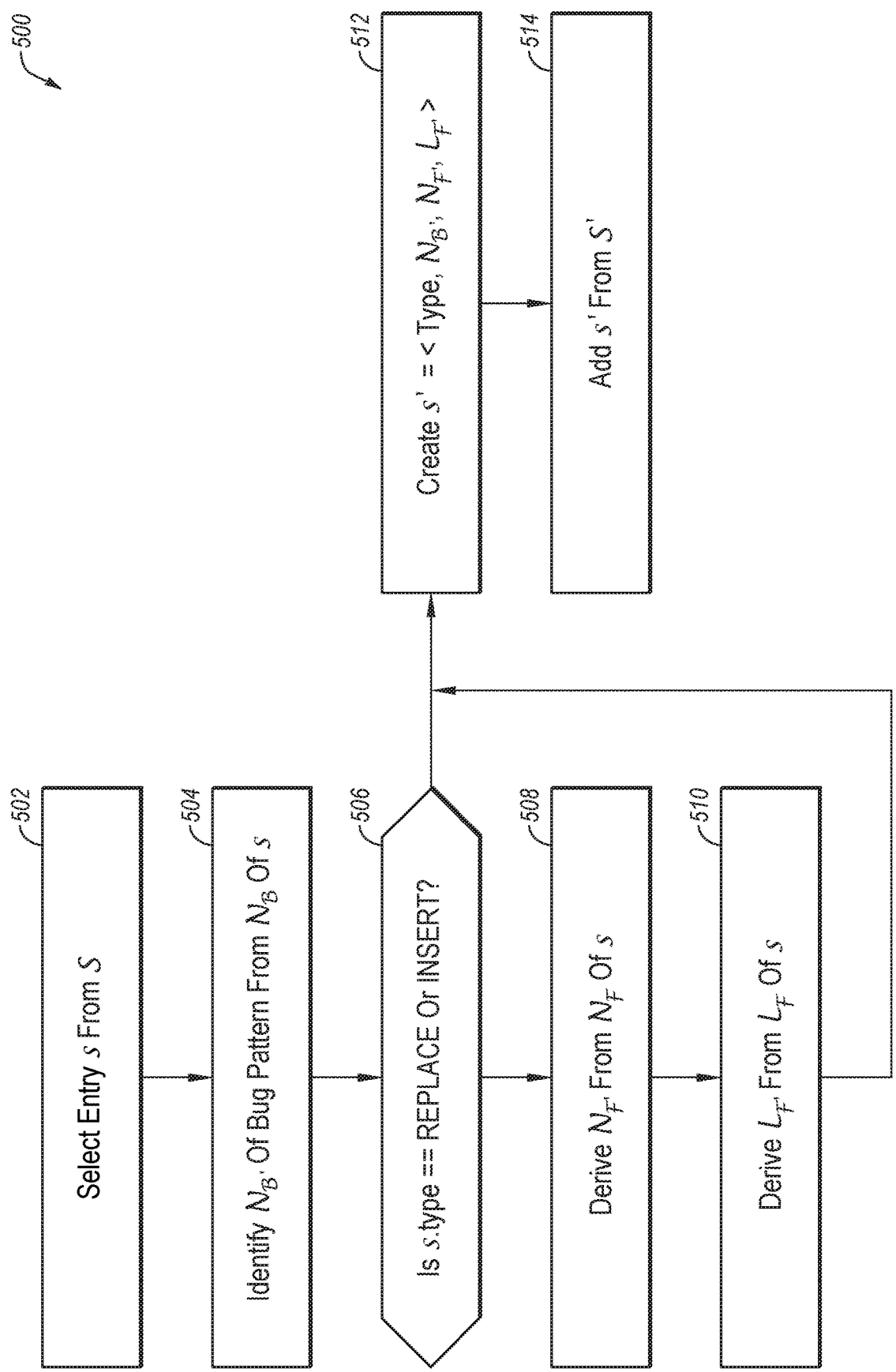
FIG. 5 is a flowchart of an example method of generating a generalized patch from a concrete patch.

FIG. 5 is a flowchart of an example method 500 of generating a generalized patch from a concrete patch, according to at least one embodiment described in the present disclosure. The method 500 may be performed by any suitable system, apparatus, or device. By way of example, the system 120 of FIG. 1A, or the computing system 202 of FIG. 2 (e.g., as directed by a module in some embodiments) may perform one or more of the operations associated with the method 500. Although illustrated with discrete blocks, the steps and operations associated with one or more of the blocks of the method 500 may be divided into additional blocks, combined into fewer blocks, or eliminated, depending on the particular implementation. In some embodiments, one or more of the operations of the method 500 may be performed with respect to block 304 of FIG. 3. For example, in some embodiments, the concrete patch of the method 500 may be the first concrete patch obtained at block 302 of the method 300 and the generalized patch of the method 500 may be the generalized patch generated at block 304.

In general, the method 500 may be configured to generate, as a generalized patch, a generalized edit script $S'$ of a concrete edit script $S$ of the concrete patch. Additionally or alternatively, the generation of the generalized patch may be based on modifying one or more concrete entries into generalized entries. As indicated above, in some embodiments, the concrete entries may be formatted as follows S=<type, $N_B$, $N_F$, $L_F$ >. The generalized entries may be formatted as follows $s'$=<type, $N_B$, $N_F$, $L_F'$ > in which elements $N_B'$, $N_F'$, and $L_F'$ are generalized versions respectively of elements $N_B$, $N_F$, and $L_F$. In the present disclosure, reference to nodes included in entries of edit scripts, such as $N_B$ and $N_F$ or $N_B'$ and $N_F'$ may refer to the information that may be indicated by or associated with such nodes (e.g., the code elements of the node) if such nodes were included in a corresponding APG. However, reference to such nodes in the entries does not require that the nodes have been included in an APG that has actually been generated.

At block 502, a concrete entry " $s$ " may be selected from the concrete edit script " $S$ " of the concrete patch. As indicated above, in some embodiments, the concrete entry may be formatted as follows $s$ =<type, $N_B$, $N_F$, $L_F$ >.

At block 504, generalized node $N_B'$ of the generalized entry $s'$ may be determined. For example, in some embodiments, the generalized node $N_B'$ may correspond to a particular node of an APG of a bug pattern (e.g., the bug pattern described above with respect to FIGS. 3 and 4). In the present disclosure, $N_B'$ may be used to refer to the particular node of the APG of the bug pattern such that the particular node may be referred to as "the node $N_B'$". Additionally or alternatively, as discussed above, reference to the node $N_B'$ may also refer to the information indicated by or associated with the node $N_B'$ (e.g., the code elements of the node).

For instance, $N_B'$, may refer to a node of the second APG of the bug pattern described with respect to FIG. 4 that matches the node $N_B$ of the first APG of the buggy code snippet described with respect to FIG. 4. In some embodiments, the node $N_{SB}'$ may be identified by identifying the node of the second APG that matches the node $N_B$ indicated in the selected entry. The identified node $N_B'$ may accordingly be a particular node of the second APG that corresponds to the selected entry. The generalized item $N_B'$ may be added to the generalized entry $s'$ by replacing $N_B$ of the concrete entry $s$ with $N_B'$. $N_B'$ may include abstractions of the concrete elements of $N_B$.

At block 506, it may be determined whether the type of operation of the selected entry is a "REPLACE" or "INSERT" operation. In response to the type of operation being "REPLACE" or "INSERT" (e.g., the type of operation is not a "DELETE" operation), the method 500 may proceed from block 506 to block 508. In response to the type of operation not being "REPLACE" or "INSERT" (e.g., the type of operation is a "DELETE" operation), the method 500 may proceed from block 506 to block 512.

At block 508, a generalized node $N_F'$ of the generalized entry $s'$ may be determined based on the concrete node $N_F$ and the bug pattern. For example, in some embodiments, the generalized node $N_F'$ may be derived based on one or more abstractions of the bug pattern that correspond to the code elements of the concrete node $N_F$. For example, as indicated with respect to FIGS. 1A and 1B, the bug pattern may be formatted according to semantic abstractions of different program elements. Additionally or alternatively, as also discussed above with respect to FIGS. 1A and 1B, the bug pattern may include one or more wildcards that correspond to different arguments (e.g., element types) of program elements. Accordingly, at block 508, in some embodiments, program elements of the code elements of the concrete node $N_F$ may be replaced with corresponding semantic abstractions included in the bug pattern as part of deriving the generalized node $N_F'$. Additionally or alternatively, at block 508, concrete element types may be replaced with corresponding wildcards included in the bug pattern as part of deriving the generalized node $N_F'$ in some embodiments.

At block 510, a location $L_F'$ of the generalized node $N_F'$ for the generalized entry $s'$ may be determined based on the location $L_F$ of the concrete entry $s$. Based on the relationship given by $L_F$, the correspondence between concrete node $L_F$ and generalized node $N_F'$, and the correspondence between concrete node $N_B$ and generalized node $N_B'$, the location $L_F'$ may be determined. For example, $L_F$ may provide the location of the concrete node $N_F$ with respect to the concrete node $N_B$. Further, concrete node $N_F$ and generalized node $N_F'$ may correspond to each other and concrete node $N_B$ and generalized node $N_B'$ may also correspond to each other. Based on the above relationships, $L_F'$ may be derived to indicate the location of generalized node $N_F'$ with respect to concrete node concrete node $N_F$.

At block 512, the generalized entry $s'$ may be created based on the information derived from one or more of blocks 504, 506, 508, and 510. For example, in instances in which the type of operation is "REPLACE" or "INSERT", the generalized entry $s'$ may include the operation type, the generalized node $N_B'$ determined at block 504, the generalized node $N_F'$ determined at block 508, and the location $L_F'$ determined at block 510. As another example, in instances in which the type of operation is "DELETE", the generalized entry $s'$ may include the operation type (e.g., "DELETE") and the indication of which buggy node to delete (e.g., the generalized node $N_B$), but the other generalized elements $N_F'$ and $L_F'$ may be blank or omitted because they may not be applicable in such instances.

At block 514, the generalized entry $s'$ may be added to the generalized edit script $S'$. In some embodiments, the method 500 may be repeated until all the concrete entries of the concrete edit script $S$ have been generalized and added to the generalized edit script $S'$.

Figure 7B:
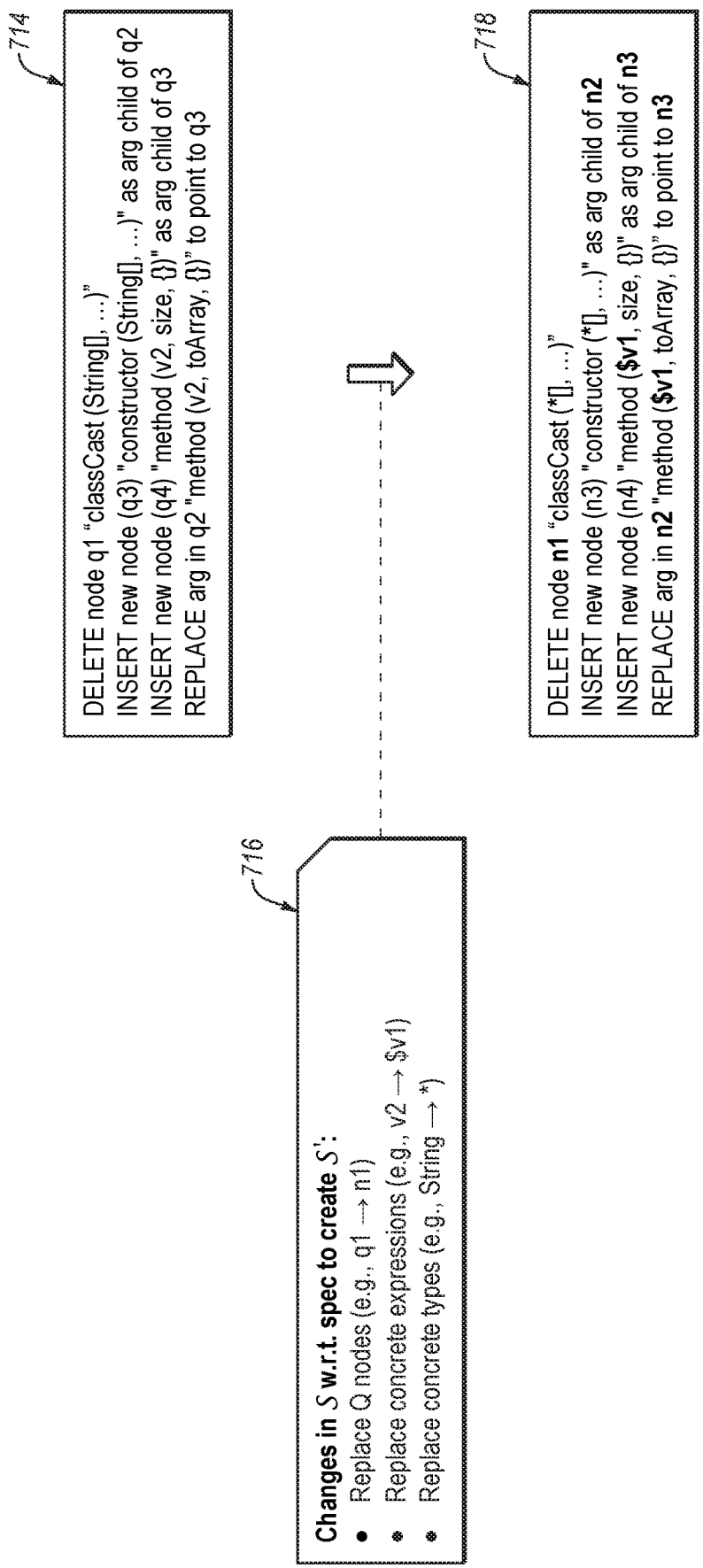
FIG. 7B illustrates an example result of performing one or more operations of the method of FIG. 5.

FIG. 7B illustrates an example result of performing one or more operations of method 500 with respect to the edit script 714 of FIG. 7A, which may be an example concrete patch. For example, using one or more operations of the method 500, changes 716 to the concrete entries of the edit script 714 may be identified and made to the edit script 714 based on the bug pattern to generate a generalized edit script 718. The generalized edit script 718 may include generalized entries that have been generated based on the concrete entries of the edit script 714 according to the changes 716. The generalized edit script 718 may be an example generalized patch.

One skilled in the art will appreciate that, for this and other processes, operations, and methods disclosed herein, the performance of the functions and/or operations of the method 500 may be implemented in differing order than described. For example, the outlined functions and operations are only provided as examples, and some of the functions and operations may be optional, combined into fewer functions and operations, or expanded into additional functions and operations without detracting from the essence of the disclosed embodiments. In some embodiments, the method 500 may include additional blocks or fewer blocks.

Figure 6:
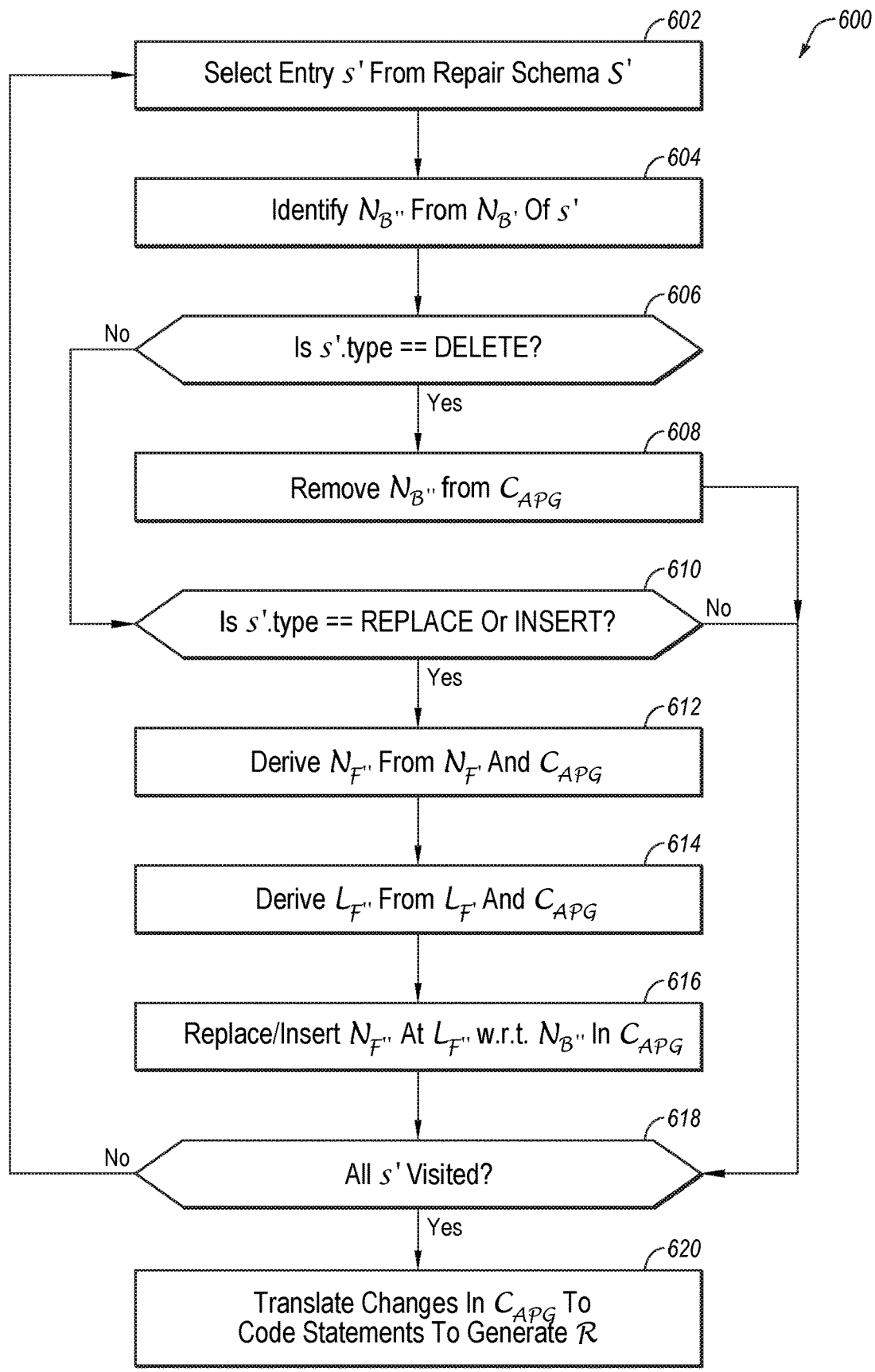
FIG. 6 is a flowchart of an example method of generating and implementing a concrete patch from a generalized patch.

FIG. 6 is a flowchart of an example method 600 of generating and implementing a concrete patch from a generalized patch, according to at least one embodiment described in the present disclosure. The method 600 may be performed by any suitable system, apparatus, or device. By way of example, the system 120 of FIG. 1A, or the computing system 202 of FIG. 2 (e.g., as directed by a module in some embodiments) may perform one or more of the operations associated with the method 600. Although illustrated with discrete blocks, the steps and operations associated with one or more of the blocks of the method 600 may be divided into additional blocks, combined into fewer blocks, or eliminated, depending on the particular implementation.

In some embodiments, one or more of the operations of the method 600 may be performed with respect to one or more of blocks 306 and 308 of FIG. 3. For example, in some embodiments, the concrete patch of the method 600 may be the second concrete patch generated at block 306 of the method 300. The second concrete patch may be used to repair the second buggy code snippet of the method 300.

In general, the method 600 may be configured to generate and implement, as a concrete patch, a concrete edit script $S''$ of a generalized edit script $S'$ of the generalized patch. Additionally or alternatively, the generation of the concrete patch may be based on modifying one or more generalized entries into concrete entries that correspond to a buggy code snippet $C$ (e.g., the buggy code snippet of the code 122 of FIG. 1A or the second buggy code snippet of the method 300). The concrete edit script $S''$ may be used to modify the buggy code snippet $C$ to obtain a repaired code snippet $\mathcal{R}$ that corrects the error of the buggy code snippet.

As indicated above, in some embodiments, the generalized entries may be formatted as follows $S'=\langle$type, $N_B, N_F, L_F \rangle$. The concrete entries may be formatted as follows $S''=\langle$type, $N_B'', N_F'', L_F'' \rangle$ in which elements $N_B''$, $N_F''$, and $L_F''$ are concrete versions respectively of elements $N_B, N_F, L_F'$, and $L_F'$, which may be concretized with respect to the buggy code snippet $C$. In the present disclosure, reference to nodes included in entries of edit scripts, such as $N_B'$ and $N_F'$ or $N_B''$ and $N_F''$ may refer to the information that may be indicated by or associated with such nodes (e.g., the code elements of the node) if such nodes were included in a corresponding APG. However, reference to such nodes in the entries does not require that the nodes have been included in an APG that has actually been generated.

At block 602, a generalized entry $S'$ may be selected from the generalized edit script $S'$ of the generalized patch. As indicated above, in some embodiments, the generalized entry $S'$ may be formatted as follows $S'=\langle$type, $N_B, N_F, L_F' \rangle$. In some embodiments, the generalized edit script $S'$ and the corresponding generalized entry $S'$ may be obtained by performing one or more operations of the method 500.

At block 604, a concrete buggy node $N_B''$ that corresponds to the generalized buggy node $N_B'$ of the lines of the generalized entry $S'$ may be identified. For example, in some embodiments, a first APG that represents the bug pattern may be generated or may have been previously generated, such as described with respect to the method 400. Further, a second APG of the buggy code snippet $C$ may be generated ($C_{APG}$). In some embodiments, the second APG may be generated in an analogous manner as the first APG.

In these or other embodiments, the first APG and the second APG may be aligned such as described above with respect to the method 400. The aligning may indicate which node of the second APG matches the generalized buggy node $N_B'$ of the first APG. The node of the second APG that matches the generalized buggy node $N_B'$ of the first APG may be identified as the concrete buggy node $N_B''$.

At block 606 it may be determined whether the operation type of the generalized entry $S'$ is a "DELETE" operation. In response to the operation type being a "DELETE" operation, the method 600 may proceed from block 606 to block 608. In response to the operation type not being a "DELETE" operation (e.g., the operation type is an "INSERT" or "REPLACE" operation), the method 600 may proceed from block 606 to block 610.

At block 608, according to the operation type being a "DELETE" operation, the concrete buggy node $N_B''$ may be removed from the second APG of the buggy code $C$. Following block 608, the method 600 may proceed to block 618.

At block 610, it may be determined whether the operation type is "REPLACE" or "INSERT." In response to the operation type being "REPLACE" or "INSERT," the method 600 may proceed to block 612 from block 610. In response to the operation type not being "REPLACE" or "INSERT," the method 600 may proceed to block 618 from block 610.

At block 612, a concrete node $N_F''$ for the second APG of the buggy code $C$ may be determined. In some embodiments, the concrete node $N_F''$ may be determined by being derived from the generalized node $N_F'$ of the generalized entry $S'$ and the second APG of the buggy code $C$. For example, a comparison between the bug pattern (based on which the generalized entry $C'$ was generalized) and the code elements of the second APG may indicate which concrete code elements of the buggy code $C$ correspond to the abstracted code elements of the generalized node $N_F'$ (e.g., the semantic abstractions, wildcards etc.). The abstracted code elements of the generalized node $N_F'$ may accordingly be replaced with the corresponding concrete code elements to derive the concrete node $N_F''$.

At block 614, a location $L_F''$ of the concrete node $N_F''$ may be determined based on the location $L_F'$ of the generalized entry $S'$. For example, the location $L_F''$ may be determined in a manner similar to that described above with respect to determining the location $L_F'$ at block 510 of the method 500.

At block 616, the "INSERT" or "REPLACE" operation may be performed with respect to concrete nodes $N_B''$ and $N_F''$ (e.g., as determined at blocks 604 and 612, respectively) according to the corresponding operation type and determined location $L_F''$.

At block 618, it may determined whether all the generalized entries of the generalized edit script $S'$ have been visited and converted into implemented concrete entries. In response to not all of the generalized entries being visited, the method 600 may proceed from block 618 to block 602 to select another generalized entry. In response to all of the generalized entries being visited, the method 600 may proceed from block 618 to block 620. At block 620, the changes made to the second APG of the buggy code $C$ may be translated into code statements to generate the repaired code snippet $\mathcal{R}$.

Figure 7C:
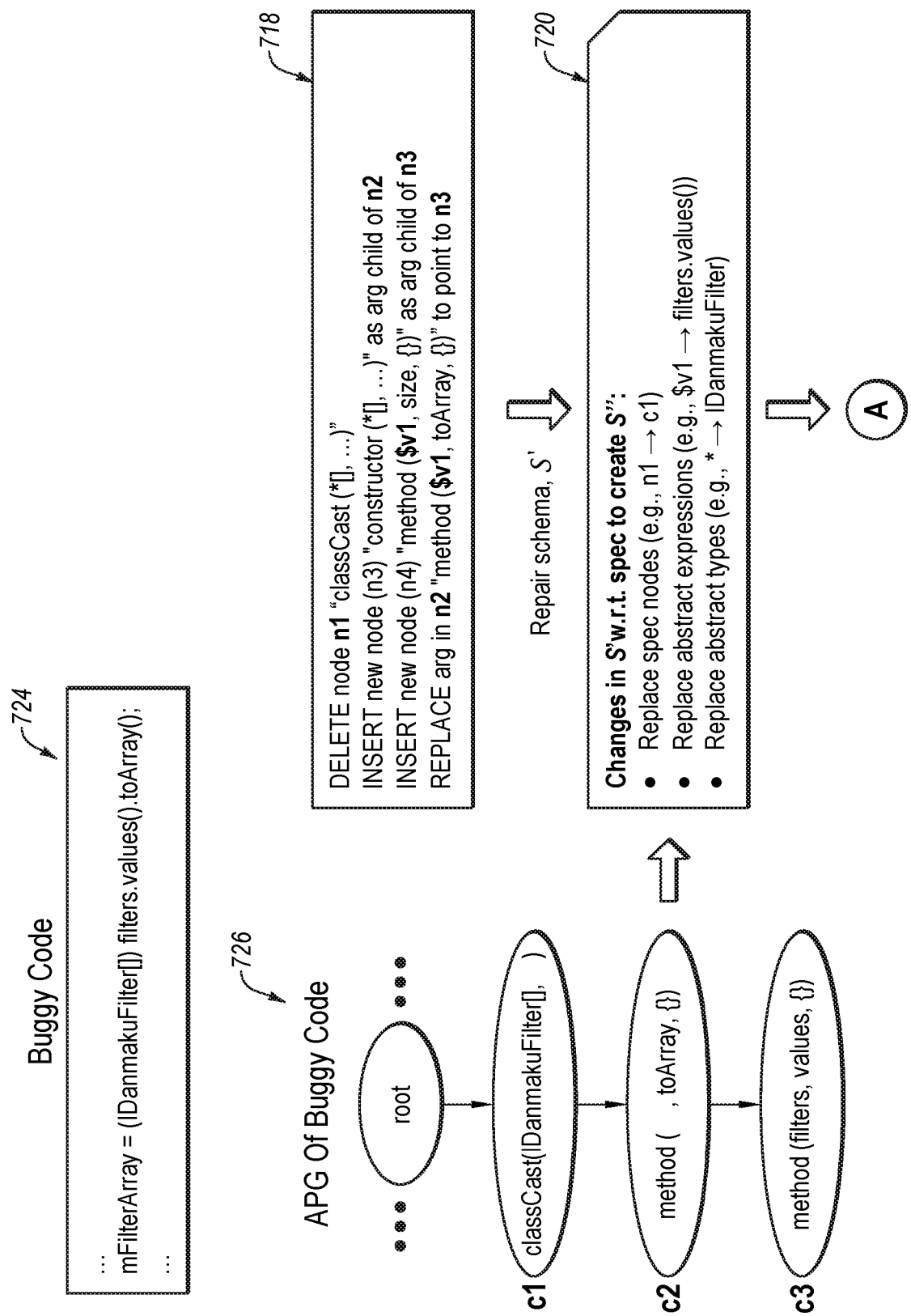
FIGS. 7C and 7D illustrate an example result of performing one or more operations of the method of FIG. 6.
Figure 7D:
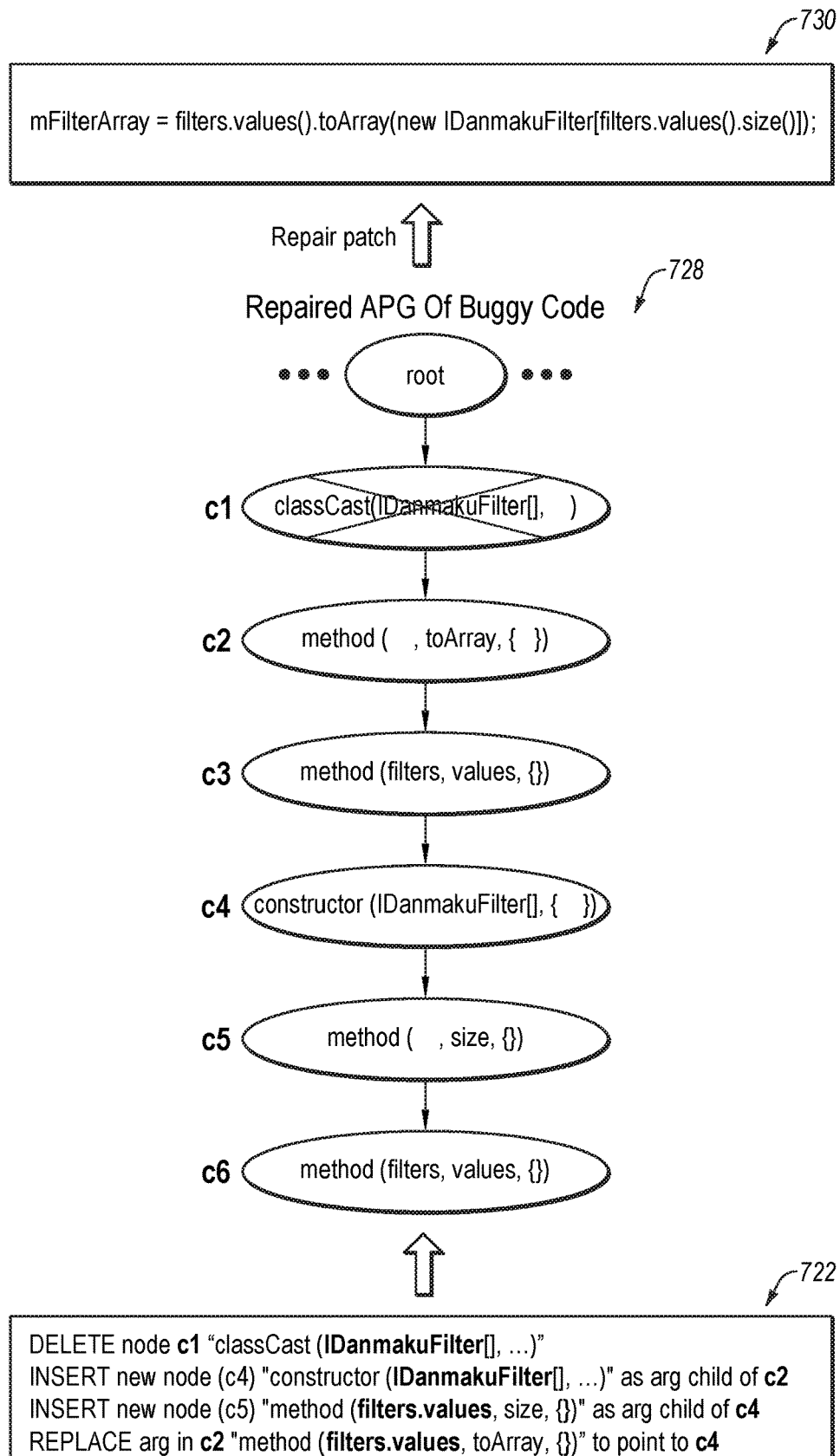

FIGS. 7C and 7D illustrates an example result of performing one or more operations of method 600 with respect to the generalized edit script 718 of FIG. 7B. For example, using one or more operations of the method 600, a buggy APG 726 of a buggy code snippet 724 may be changed by implementing a concrete edit script 722 with respect to the buggy APG 726. The concrete edit script 722 may be determined by identifying changes 720 that may be made to the generalized edit script 718 to concretize the generalized edit script into the concrete edit script 722. The identification of the changes may be made by performing one or more operations of the method 600, such as those described with respect to blocks 604, 612, and/or 614 of the method 600. Further, the method 600 may implement the concrete edit script 722 by changing the buggy APG 726 into a repaired APG 728 according to the operations dictated by the concrete edit script 722. In these or other embodiments, the repaired APG 728 may be translated into code statements to obtain a repaired code snippet 730, which may correct the error of the buggy code snippet 724. Therefore, according to the method 600, one or more repair operations may be identified and made to the buggy code snippet 724 to correct one or more errors included in the buggy code snippet.

One skilled in the art will appreciate that, for this and other processes, operations, and methods disclosed herein, the functions and/or operations performed with respect to the method 600 may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. Further, in some embodiments, the method 600 may include additional blocks or fewer blocks.

For example, in the example operations of the method 600, the entries of the concrete edit script $S''$ are described as being implemented as the different elements of the entries are determined such that the actual concrete edit script $S''$ outlining the operations may not be explicitly generated as illustrated in FIG. 7C. Additionally or alternatively, the concrete edit script $S''$ may be generated such as illustrated in FIG. 7C.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 or data storage 254 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." This interpretation of the phrase "A or B" is still applicable even though the term "A and/or B" may be used at times to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   obtaining a first patch that corrects a first error in a first buggy code snippet of first source code based on the first buggy code snippet;
   generating a generalized patch based on the first patch and a bug pattern of a bug scenario that corresponds to the first error, the bug scenario including conditions or characteristics of the first source code that cause the first error in the first buggy code snippet, the bug pattern indicating relationships between the conditions or characteristics of the bug scenario, the generating of the generalized patch based on the first patch including converting one or more first elements of the first patch that are specific to the first buggy code snippet into one or more abstractions that are generalized versions of the one or more first elements in which the generalized patch includes the one or more abstractions instead of the one or more first elements and in which the one or more abstractions are determined based on a first comparison between a representation of the bug pattern and a first representation of the first buggy code snippet;
   generating a second patch based on the generalized patch, the bug pattern, and a second buggy code snippet of second source code, the second patch correcting a second error in the second buggy code snippet, the generating of the second patch based on the generalized patch including converting the one or more abstractions of the generalized patch into one or more second elements that are specific to the second buggy code snippet in which the second patch includes the one or more second elements instead of the one or more abstractions and in which the one or more second elements are determined based on a second comparison between the representation of the bug pattern and a second representation of the second buggy code snippet; and performing one or more repair operations with respect to the second buggy code snippet based on the second patch.

2. The method of claim 1 further comprising:
obtaining the first buggy code snippet based on a determination that the first error is the same as the second error;
obtaining a first repaired code snippet of the first source code, the first error being corrected in the first repaired code snippet; and
obtaining the first patch based on the first buggy code snippet and the first repaired code snippet.

3. The method of claim 2 further comprising:
building, as the first representation, a first Abstract Program Graph (APG) that represents the first buggy code snippet;
building, as the representation of the bug pattern, a second APG that represents the bug pattern;
pruning the first APG to first nodes that match second nodes of the second APG;
building a third APG that represents the first repaired code snippet; and
pruning the third APG based on the first nodes of the pruned first APG, wherein obtaining the first patch is based on the pruned first APG and the pruned third APG.

4. The method of claim 1, wherein the first patch is obtained from a post obtained from a website.

5. The method of claim 1 further comprising:
building, as the first representation, a first Abstract Program Graph (APG) that represents the first buggy code snippet;
building, as the representation of the bug pattern, a second APG that represents the bug pattern;
identifying a particular first node of the first APG that corresponds to a first entry of the first patch;
identifying a particular second node of the second APG that matches the particular first node; and
generating a second entry of the generalized patch that corresponds to the first entry based on the particular second node and the particular first node.

6. The method of claim 5 further comprising:
deriving a version of a repaired node of the first entry based on an abstraction of the bug pattern that corresponds to a code element of the repaired node; and
annotating the second entry with the version of the repaired node.

7. The method of claim 6, wherein the code element includes a first expression and deriving the version includes replacing the first expression with a corresponding second expression included in the bug pattern.

8. The method of claim 6, wherein the code element includes a first element type and deriving the version includes replacing the first element type with a corresponding second element type included in the bug pattern.

9. The method of claim 1 further comprising:
building, as the representation of the bug pattern, a first Abstract Program Graph (APG) that represents the bug pattern;
building, as the second representation, a second APG that represents the second buggy code snippet; identifying a first node of the first APG that corresponds to a first entry of the generalized patch;
identifying a second node of the second APG that matches the first node; and
generating a second entry of the second patch that corresponds to the first entry based on the second node and the first node.

10. The method of claim 9 further comprising:
deriving a version of a repaired node of the first entry based on a code element of the second APG that corresponds to an abstraction of the bug pattern; and
annotating the second entry with the version of the repaired node.

11. One or more non-transitory computer-readable storage media storing instructions that, in response to being executed, cause a system to perform operations, the operations comprising:
obtaining a first patch that corrects a first error in a first buggy code snippet of first source code based on the first buggy code snippet;
generating a generalized patch based on the first patch and a bug pattern of a bug scenario that corresponds to the first error, the bug scenario including conditions or characteristics of the first source code that cause the first error in the first buggy code snippet, the bug pattern indicating relationships between the conditions or characteristics of the bug scenario, the generating of the generalized patch based on the first patch including converting one or more first elements of the first patch that are specific to the first buggy code snippet into one or more abstractions that are generalized versions of the one or more first elements in which the generalized patch includes the one or more abstractions instead of the one or more first elements and in which the one or more abstractions are determined based on a first comparison between a representation of the bug pattern and a first representation of the first buggy code snippet;
generating a second patch based on the generalized patch, the bug pattern, and a second buggy code snippet of second source code, the second patch correcting a second error in the second buggy code snippet, the generating of the second patch based on the generalized patch including converting the one or more abstractions of the generalized patch into one or more second elements that are specific to the second buggy code snippet in which the second patch includes the one or more second elements instead of the one or more abstractions and in which the one or more second elements are determined based on a second comparison between the representation of the bug pattern and a second representation of the second buggy code snippet; and
performing one or more repair operations with respect to the second buggy code snippet based on the second patch.

12. The one or more computer-readable storage media of claim 11, wherein the operations further comprise:
obtaining the first buggy code snippet based on a determination that the first error is the same as the second error;

obtaining a first repaired code snippet of the first source code, the first error being corrected in the first repaired code snippet; and obtaining the first patch based on the first buggy code snippet and the first repaired code snippet.

13. The one or more computer-readable storage media of claim 12, wherein the operations further comprise:

building, as the first representation, a first Abstract Program Graph (APG) that represents the first buggy code snippet;

building, as the representation of the bug pattern, a second APG that represents the bug pattern;

pruning the first APG to first nodes that match second nodes of the second APG;

building a third APG that represents the first repaired code snippet; and pruning the third APG based on the first nodes of the pruned first APG, wherein obtaining the first patch is based on the pruned first APG and the pruned third APG.

14. The one or more computer-readable storage media of claim 11, wherein the operations further comprise:

building, as the first representation, a first Abstract Program Graph (APG) that represents the first buggy code snippet;

building, as the representation of the bug pattern, a second APG that represents the bug pattern;

identifying a particular first node of the first APG that corresponds to a first entry of the first patch;

identifying a particular second node of the second APG that matches the particular first node; and generating a second entry of the generalized patch that corresponds to the first entry based on the particular second node and the particular first node.

15. The one or more computer-readable storage media of claim 14, wherein the operations further comprise:

deriving a version of a repaired node of the first entry based on an abstraction of the bug pattern that corresponds to a code element of the repaired node; and annotating the second entry with the version of the repaired node.

16. The one or more computer-readable storage media of claim 15, wherein:

the code element includes a first expression and deriving the version includes replacing the first expression with a corresponding second expression included in the bug pattern; or the code element includes a first element type and deriving the version includes replacing the first element type with a corresponding second element type included in the bug pattern.

17. The one or more computer-readable storage media of claim 11, wherein the operations further comprise:

building, as the representation of the bug pattern, a first Abstract Program Graph (APG) that represents the bug pattern;

building, as the second representation, a second APG that represents the second buggy code snippet;

identifying a first node of the first APG that corresponds to a first entry of the generalized patch;

identifying a second node of the second APG that matches the first node; and generating a second entry of the second patch that corresponds to the first entry based on the second node and the first node.

18. The one or more computer-readable storage media of claim 17, wherein the operations further comprise:

deriving a version of a repaired node of the first entry based on a code element of the second APG that corresponds to an abstraction of the bug pattern; and annotating the second entry with the version of the repaired node.

19. A system comprising:

one or more processors; and one or more non-transitory computer-readable storage media storing instructions that, in response to being executed by the one or more processors, cause the system to perform operations, the operations comprising:

obtaining a first patch that corrects a first error in a first buggy code snippet of first source code based on the first buggy code snippet;

generating a generalized patch based on the first patch and a bug pattern of a bug scenario that corresponds to the first error, the bug scenario including conditions or characteristics of the first source code that cause the first error in the first buggy code snippet, the bug pattern indicating relationships between the conditions or characteristics of the bug scenario, the generating of the generalized patch based on the first patch including converting one or more first elements of the first patch that are specific to the first buggy code snippet into one or more abstractions that are generalized versions of the one or more first elements in which the generalized patch includes the one or more abstractions instead of the one or more first elements and in which the one or more abstractions are determined based on a first comparison between a representation of the bug pattern and a first representation of the first buggy code snippet;

generating a second patch based on the generalized patch, the bug pattern, and a second buggy code snippet of second source code, the second patch correcting a second error in the second buggy code snippet, the generating of the second patch based on the generalized patch including converting the one or more abstractions of the generalized patch into one or more second elements that are specific to the second buggy code snippet in which the second patch includes the one or more second elements instead of the one or more abstractions and in which the one or more second elements are determined based on a second comparison between the representation of the bug pattern and a second representation of the second buggy code snippet; and performing one or more repair operations with respect to the second buggy code snippet based on the second patch.

20. The system of claim 19, wherein the operations further comprise:

building, as the first representation, a first Abstract Program Graph (APG) that represents the first buggy code snippet;

building, as the representation of the bug pattern, a second APG that represents the bug pattern;

identifying a particular first node of the first APG that corresponds to a first entry of the first patch;

identifying a particular second node of the second APG that matches the particular first node; and generating a second entry of the generalized patch that corresponds to the first entry based on the particular second node and the particular first node.

\* \* \* \* \*